United States Patent [19]

Ohmi et al.

[11] Patent Number: 5,990,060
[45] Date of Patent: Nov. 23, 1999

[54] CLEANING LIQUID AND CLEANING METHOD

[75] Inventors: Tadahiro Ohmi, 1-17-301, Komegabukuro 2-chome, Aoba-ku, Sendai-shi, Miyagi-ken 980-0813; Shunkichi Omae; Takayuki Jizaimaru, both of Miyagi-ken; Takahisa Nitta, Tokyo, all of Japan

[73] Assignee: Tadahiro Ohmi, Miyagi-ken, Japan

[21] Appl. No.: 09/030,299

[22] Filed: Feb. 25, 1998

[30] Foreign Application Priority Data

Feb. 25, 1997 [JP] Japan .................................. 10-044084
Feb. 26, 1997 [JP] Japan .................................... 9-042745

[51] Int. Cl.$^6$ ................ C11D 7/10; C11D 7/18; C03C 23/00; C09K 13/08
[52] U.S. Cl. .................. 510/175; 134/1; 134/2; 134/3; 252/79.3; 252/186.1; 438/753; 438/756
[58] Field of Search ..................... 510/175, 176; 134/1, 2, 3; 252/79.3, 186.1; 438/753, 756

[56] References Cited

U.S. PATENT DOCUMENTS

| 3,979,241 | 9/1976 | Maeda et al. ............................. 156/13 |
| 4,917,123 | 4/1990 | McConnell et al. ....................... 134/95 |
| 5,679,171 | 10/1997 | Saga et al. .................................. 134/3 |
| 5,858,106 | 1/1999 | Ohmi et al. ................................. 134/1 |

FOREIGN PATENT DOCUMENTS

| 08187474 | 7/1996 | Japan ................................ B08B 3/08 |
| 08306655 | 11/1996 | Japan ........................... H01L 21/304 |
| PCT/JP97/02311 | 7/1997 | Japan ........................... H01L 21/304 |

OTHER PUBLICATIONS

Tadahiro Ohmi, "Ultraclean ULSI Technology", Baifukan, pp. 226–223, Dec. 1995.

*Primary Examiner*—Mark Kopec
*Assistant Examiner*—John M Petruncio
*Attorney, Agent, or Firm*—Randall J. Knuth

[57] ABSTRACT

A cleaning method and a cleaning device which require an extremely short time for processing and also insure and extremely high cleaning effect. Foreign materials deposited on a substrate are removed with a cleaning liquid prepared by mixing a basic and water-soluble fluoride and an oxidizing agent in pure water.

22 Claims, 3 Drawing Sheets

CLEANING LIQUID AND CLEANING METHOD

BACKGROUND OF THE INVENTION AND DESCRIPTION OF RELATED TECHNOLOGIES

1. Field of the Invention

The present invention relates to a cleaning method and a cleaning device, and more specifically to a cleaning method and a cleaning device which can remove foreign materials deposited on a substrate after removal of photoresist by plasma processing.

2. Background Technology

Conventionally, when separating resist in production of semiconductors or liquid-crystal display units, generally sulfuric acid and hydrogen peroxide are mixed with each other in the state of respective raw liquids under a high temperature in a range from 100 to 150° C. Or, in a case where the solution above has strong acidity and can not be used because of the bad effects over the substrate or other portions, an organic solvent with high concentration is used under a high temperature to remove the foreign materials as described above. Also in semiconductor production in recent years, a degree of integration to be realized has been becoming increasingly higher and higher, so that ion injection or reactive ion etching is required using photoresist as a mask, but in this type of processing a large quantity of ions is irradiated onto a surface of photoresist, and the photoresist material itself is bridged and cured, so that it is difficult to remove the foreign materials as described above only by means of wet cleaning in which a mixed solution of sulfuric acid and hydrogen peroxide or a high concentration organic solvent is used, and for this reason, after the cured photoresist section is burnt and removed by employing the plasma processing with oxygen plasma, and then remaining photoresist is removed with a chemical agent.

In the plasma processing, however, there are such defects as that foreign materials such as metal or fine particles included in photoresist remain after processing on the substrate, that, in ion injection, a large quantity ($10^{15}/cm^2$ or more) of such elements as phosphor or boron is irradiated, the photoresist material itself is bridged and cured, and can not completely be removed after the processing, and photoresist remains as a foreign material on the substrate, or that, in reactive etching by using a fluorocarbon (CF)-based material, a CF-based deposited material layer is formed on the photoresist and the CF-based deposited material remains as a foreign material after the plasma processing, and there is the problem that the foreign materials as described above can not completely be removed by using sulfuric acid and hydrogen peroxide, or an organic solvent.

Further, in the method of a mixed solution of sulfuric acid and hydrogen peroxide, the processing is executed using a high density solution under a high temperature, so that use of the cleaning liquid or transfer of silicon wafer is rather poor in its operability, and further hydrogen peroxide in the cleaning liquid is decomposed because of the high density and high temperature employed in the processing, so that management of the solution is very complicated, and in addition, a large quantity of vapor of chemicals or water is generated, and a large volume of clean air is required and a scrubber is required to remove vapor of chemicals from the exhaust air, which results in high power cost as well as in high device cost, and moreover high cost is disadvantageously required to process wasted liquid of the sulfuric acid.

Also the method of using an organic solvent is carried out under a high temperature and the operability is very poor, and further management of the processing liquids is difficult and it is substantially impossible to recover or recycle the processing liquids.

SUMMARY AND PURPOSE OF THE INVENTION

The present invention makes it possible to solve the problems associated with the conventional type of cleaning liquids as well as of cleaning methods and to completely remove foreign materials deposited on a substrate after photoresist for ion injection or reactive ion etching is removed by means of plasma processing, and further the process can be carried out under the room temperature and vapor of chemicals used in the process is little generated, and for the reasons as described above, it is an object of the present invention to provide a cleaning liquid and a cleaning method which enable size reduction of a device required for the process, generate no leakage of processing liquids on a surface of the substrate and provide a high cleaning effect.

The present inventors made strenuous efforts for solving the problems associated with the conventional type of cleaning liquids as well as with the conventional type of cleaning method, found out that it was possible to remove foreign materials deposited on a substrate without causing leakage on a surface of the substrate under the room temperature by using a cleaning liquid in which a basic and water-soluble fluoride and an oxidizing agent are mixed in pure water, and made the present invention.

Detailed reasons why the cleaning liquid according to the present invention provides a high cleaning effect have not been clarified yet, but are probably as follows. The basic and water-soluble fluoride is dissociated in an aqueous solution and generates $HF_2^-$ ions used for etching silicon oxide film.

Also the aqueous solution of the basic and water-soluble fluoride shows alkalinity, and an alkaline solution etches such materials as silicon or Al. Namely this cleaning liquid has the characteristics that the liquid can etch silicon oxide film, silicon, Al or the like.

It can be considered that foreign materials deposited on a surface of a substrate can be removed because this cleaning liquid etches the substrate.

Also it can be considered that, because an oxidizing agent is added to oxidize a substrate, etching of the substrate by this cleaning method is uniformly executed and surface leakage of the substrate is suppressed.

The basic and water-soluble fluoride available in the present invention includes potassium fluoride, sodium fluoride, or ammonium fluoride or tetra-methyl fluoride, each of which is alkaline metallic fluoride salt.

Density of potassium fluoride used in the process according to the present invention is in a range from 0.05 to 51 weight %, preferably in a range from 1 to 30 weight %, and further preferably in a range from 2 to 20 weight %. When density of potassium fluoride is less than 0.05 weight %, a removal rate of foreign materials deposited on a substrate is low, and when the density is higher than 51 weight %, an etching rate in the substrate becomes higher, which disadvantageously generates leakage on a surface of the substrate.

Density of sodium fluoride used in the process according to the present invention is in a range from 0.05 to 4.8 weight %. When the density is lower than 0.05 weight %, a removal rate of foreign materials deposited on a substrate is low, and when the density is higher than 4.8%, the etching rate in the substrate increases with surface leakage on the substrate generated, which is not preferable. Further density of ammonium fluoride is in a range from 0.05 to 49 weight %, preferably in a range from 1 to 30 weight %, and more preferably in a range from 2 to 20 weight %.

When density of ammonium fluoride is lower than 0.05 weight %, a removal rate of foreign materials deposited on a substrate is low, and when the density is higher than 49 weight %, the etching rate in the substrate increased with surface leakage on the substrate generated, which is not preferable. Density of tetra-methyl ammonium fluoride is generally in a range from 0.05 to 60 weight %, preferably in a range from 1 to 30 weight %, and more preferably in a range from 2 to 20 weight %. When density of tetra-methyl ammonium fluoride is lower than 0.05 weight %, a removal rate of foreign materials deposited on a substrate is low, and when the density is higher than 60 weight %, the etching rate in the substrate increases with surface leakage on the substrate generated, which is not preferable.

The oxidizing agent available in the process according to the present invention includes a hydrogen peroxide solution and an ozonic solution. Density of hydrogen peroxide solution is generally in a range from 0.01 to 30 weight %, preferably in a range from 0.1 to 25 weight %, and more preferably in a range from 0.5 to 20 weight %.

When density of a hydrogen peroxide solution is less than 0.01 weight %, the effect to suppress surface leakage on a substrate by the basic and water-soluble fluoride becomes lower with surface leakage on the substrate generated, and when the density is higher than 30 weight %, a quantity of vapor of hydrogen peroxide is very large and a load to the exhaust facility increases, which is not preferable.

Density of the ozonic solution is usually in a range from 0.01 to 100 ppm, preferably in a range from 0.1 to 100 ppm, and more preferably in a range from 5 to 100 ppm. When density of the ozonic solution is less than 0.01 ppm, the effect to suppress surface leakage on the substrate by the basic and water-soluble fluoride becomes lower with surface leakage on the substrate generated, which is not preferable. Also when density of the ozonic solution is higher than 100 ppm, the effect to suppress surface leakage on the substrate by the basic and water-soluble fluoride is kept constant.

The cleaning liquid according to the present invention can completely remove foreign materials deposited on a substrate after photoresist for ion injection or reactive ion etching used in a semiconductor production process or a flat display panel production process is removed by means of plasma processing, and it can be guessed that metal or fine particles included in photoresist are left as foreign materials on the substrate after plasma processing, that, in ion injection, a large quantity ($10^{15}$/cm$^2$ or more) of such elements as phosphor or boron is irradiated, the photoresist material itself is cured and can not completely be removed after the processing, and photoresist remains as a foreign material on the substrate, or that, in reactive etching by using a fluorocarbon (CF)-based material, a CF-based deposited material layer is formed on the photoresist and the CF-based deposited material remains as a foreign material after the plasma processing, and there is the problem that the foreign materials as described above can not completely be removed by using sulfuric acid and hydrogen peroxide, or an organic solvent.

After foreign materials deposited on a substrate after plasma processing of photoresist used in ion injection or reactive ion etching processing are removed with the cleaning liquid according to the present invention, by executing rinsing with pure water, the cleaning liquid is completely removed from the substrate. Further by irradiating ultrasonic wave to the cleaning liquid or pure water, it is possible to improve the cleaning effect.

A frequency of the ultrasonic wave is generally used in a range from 0.2 to 10 MHz, preferably in a range from 0.8 to 4 MHz, and more preferably in a range from 1 to 3 MHz. When a frequency of the ultrasonic wave is lower than 0.2 MHz, cavitation is generated, which is not preferable in production of semiconductors because a form of wiring of polysilicon, aluminum or the like is broken. When the frequency of ultrasonic wave is higher than 10 MHz, a sonic pressure (vibration acceleration) becomes higher, which is preferable in the sense that the effect for removing the foreign materials is improved, but when the frequency exceeds 10 MHz, the temperature increase becomes remarkable, which is not preferable because an apparatus with a large cooling capability is required.

Further, as the high effect for removing the foreign materials can be obtained, it is preferable to move up and down a substrate during cleaning. With this operation, the effect for removing the foreign materials is further improved. The reasons are consumably that a high flow velocity of a cleaning liquid can be obtained on a liquid surface because of ultrasonic wave, and that dense and active sections are formed near the interface under influences by straight waves and synthetic waves (standing waves) on the liquid surface, and for the reasons as described above the effect for removing the foreign materials is improved when a substrate is moved up and down at the interface.

Further when a substrate is moved in the horizontal direction, the cleaning effect can further be improved because sonic wave is irradiated uniformly. Also by providing 1–2 or more nozzles in a cleaning liquid and injecting the cleaning liquid to a surface of the substrate, the cleaning effect can further be improved.

Further the present invention is characterized in that an inner vessel with the cleaning liquid therein is placed inside an outer vessel filled with a liquid, and irradiation of ultrasonic wave to the cleaning liquid is executed intermittently by ultrasonic wave vibrators provided inside the outer vessel. With this operation, it is possible to maintain a temperature of the cleaning liquid substantially at the room temperature.

Another aspect of the present invention is a cleaning method in which, by irradiating ultrasonic wave to a cleaning method prepared by mixing ammonium fluoride or alkali fluoride metal salt and an oxidizing agent in pure water, the cleaning liquid is supplied via a nozzle or the like to remove foreign materials deposited on a substrate. When this cleaning method is employed, countermeasures against temperature increase of the cleaning liquid due to irradiation of ultrasonic wave is not required, which makes it possible to reduce a size of a cleaning device. Also when this cleaning method is employed, it is preferable to rotate a substrate. When a substrate is rotated, a centrifugal force is generated and a velocity of the cleaning liquid is accelerated by the ultrasonic wave flowing on a surface of the rotating substrate, so that the effect for removing the foreign materials is further improved.

An injection port of the nozzle used when a cleaning liquid with the ultrasonic wave irradiated thereto is supplied to a substrate may be moved reciprocally in the radial direction of a substrate, and also it is allowable to use a line-formed nozzle having an injection port straight in the radial direction of the substrate and narrow in the peripheral direction of the substrate. A size of an injection port of the nozzle should preferably be larger than a wavelength of the ultrasonic wave in a cleaning liquid so that the ultrasonic wave can efficiently pass therethrough. For instance, when ultrasonic wave with a frequency of 1.0 MHz (Wavelength: 1.5 mm), a size of the injection port of the nozzle should preferably be 1.5 mm or more.

With the present invention, cleaning can be carried out under the room temperature, and a temperature of the cleaning liquid is controlled within a range from 15 to 40° C., but the cleaning liquid may be heated or cooled in use. When a temperature of the cleaning liquid is less than 5° C., however, the effect for removing the foreign materials becomes lower, and when the temperature is higher than 80° C., the cleaning effect is improved, but a quantity of cleaning liquid evaporated during cleaning increases, and also fluctuation in composition of the cleaning liquid increases, which is not preferable.

It is possible to filter a cleaning liquid with the foreign materials having been removed therefrom with a filter and recycle the cleaning liquid for reuse. As a material for the filter for filtering and circulation, it is preferable to use a filter with a hole diameter smaller than a diameter of the foreign materials and made from a material having resistance against a fluoride or a solution of an oxidizing agent such as PFA.

Also it is preferable to provide a number of filters each having a different hole diameter in multiple stages so that diameters of the filters becomes increasingly in the downstream direction of the flow, and for instance, if the filters are provide in two stages, a diameter of particles removed by a filter in the former stage should be 0.5 $\mu$m, while a diameter of particles removable by a filter in the latter stage should be 0.05 $\mu$m, and with this configuration the foreign materials removed by the cleaning liquid can efficiently be collected.

Further it is preferable to provide the filters in parallel in two or more arrays. Namely, with this configuration, it becomes possible to usually use only one array of filters, and when the removal ratio becomes lower, the filter array can be switched to another one, thus the necessity for stopping operation of a cleaning device associated with filter exchange being eliminated.

Resist is always required from the photolithographic process to the next ion injection process or reactive ion etching (RIE) process. However, if a substrate with resist adhered thereto is exposed to atmospheric air, organic materials and particles are generated from the resist layer, which may contaminate the atmospheric air. For this reason, it is preferable to immediately remove a resist layer from a substrate having been subjected to the ion injection process or RIE process before the resist layer is exposed to the atmospheric air.

For the reasons as described above, a plasma device for removing resist used after the ion injection process or reactive ion etching process is directly connected or is provided adjacent to an ion injection device or a reactive ion etching device, while a cleaning device for removing foreign materials deposited on a substrate by irradiating ultrasonic wave to a cleaning liquid prepared by mixing ammonium fluoride or alkali fluoride metal salt and an oxidizing agent into pure water in the plasma processing is directly connected or provided adjacent to the plasma processing device, and with this configuration it is possible to transfer a substrate with no resist deposited thereon.

DESCRIPTION OF THE REFERENCE NUMERALS

101: Inner vessel,
102: Cleaning liquid,
103: Outer vessel,
104: Liquid,
105: Ultrasonic vibrator,
106: Filter
107: Deaeration film,
108: Circulation pump,
109: Heat exchanger,
110: Cooling water,
201: Substrate,
202: Rotating device,
203: Cleaning liquid supply nozzle,
204: Cleaning liquid supply unit,
205: Ultrasonic vibrator,
206: Rotary table,
207: Recovery tank,
3: Silicon wafer,
4: CVC oxidizing layer,
5: Resist layer,
6: Foreign material.

DETAILED DESCRIPTION OF THE PREFERRED EMBODIMENTS

Figure 1:
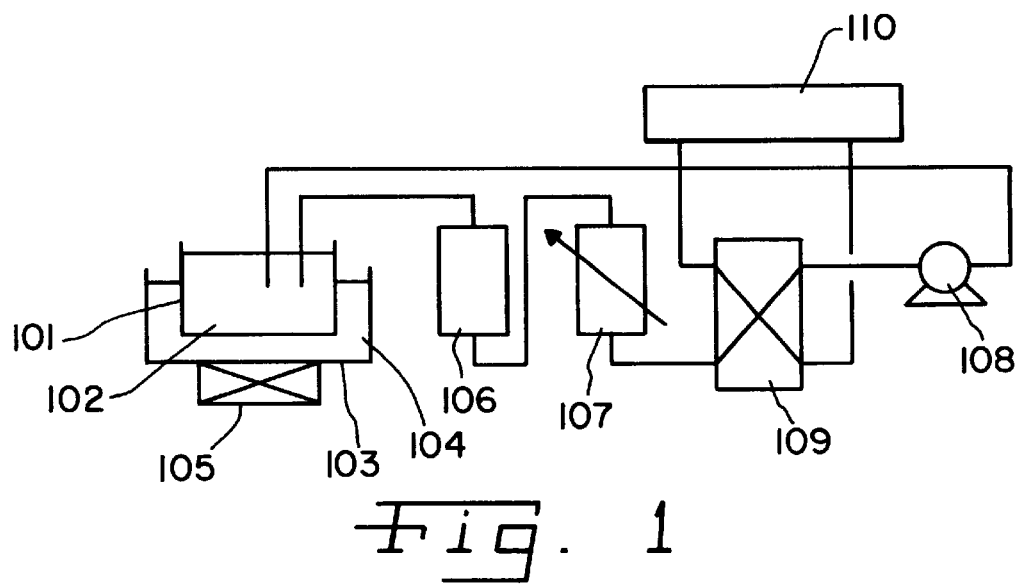
FIG. 1 is a conceptual view showing an example of a cleaning device for implementing the cleaning method according to the present invention.

Next description is made for an embodiment of the present invention with reference to FIG. 1.

FIG. 1 shows an example of a cleaning tank used for batch processing for the purpose to apply the cleaning method according to the present invention.

In FIG. 1, the reference numeral 101 indicates an inner vessel filled with a cleaning liquid 102 prepared by mixing ammonium fluoride or alkali metal fluoride salt and an oxidizing agent in pure water. The reference numeral 103 indicates an outer vessel with a ultrasonic vibrator 105 attached to an external wall thereof, and a liquid 104 such as pure water is filled therein.

A substrate is steeped into the cleaning liquid 102, and a voltage is loaded to the ultrasonic vibrator 105. Ultrasonic wave oscillated from the vibrator is irradiated via the outer vessel 103, liquid 104, and inner vessel 101 to the cleaning liquid 102, and foreign materials deposited on the substrate can quite efficiently be removed under a temperature around the room temperature because of the synergistic effect between the ultrasonic wave and components of the cleaning liquid. By circulating the cleaning liquid with a circulation pump 108 through a deaeration unit 107 for deaeration, the cleaning effect is further improved. In this step, impurities such as separated resist can be removed with the filter 106.

It is preferable to execute cleaning with the cleaning temperature under the room temperature, and also cleaning may be executed under a high temperature with a heating device or the like, but in that case, it becomes difficult to manage vapor, and also the running cost is affected.

Temperature of the cleaning liquid can be kept constant, when circulating the cleaning liquid with the pump 108, by cooling the cleaning liquid with the heat exchanger 109.

It should be noted that an increase rate of a temperature of the cleaning liquid changes according to various conditions including a power, a frequency, and an irradiation time of the ultrasonic wave. Various methods are available for maintaining a temperature of the cleaning liquid within a specified range, and for instance, the liquid 104 shown in FIG. 1 may be cooled while the liquid is circulated.

Although pure water to be used in the present invention depends on a type of a substrate to be cleaned, generally that with little impurities contained therein is used, and when photoresist for a semiconductor substrate, it is preferable to use ultra-pure water which contains several particles each having a diameter or 0.05 μm or more per 1 ml and also having a specific resistance value of 18 MΩ.cm or more, and a value of TOC (All Organic Carbon) or silica of 1 ppb or less.

It should be noted that, as the liquid 104 such as pure water used in FIG. 1, deaerated one should preferably be used to efficiently deliver ultrasonic wave. Also a deaerated cleaning liquid should preferably be used. The gas content should be 1 ppm or less, and more preferably be 50 ppb or less.

The present invention should not necessarily be based on the two-vessel configuration as shown in FIG. 1, and one-vessel configuration is allowable in which a vibrator is attached to an external wall thereof and ultrasonic wave is directly irradiated to the cleaning liquid, and in that case a temperature of the cleaning liquid can be kept constant by intermittently irradiating the ultrasonic wave or circulating the cleaning liquid through a thermostatic bath. A number of vibrators is not limited to one, and a plurality of vibrators may be provided on a side wall, on a bottom surface, or on a top surface of the vessel.

Figure 2:
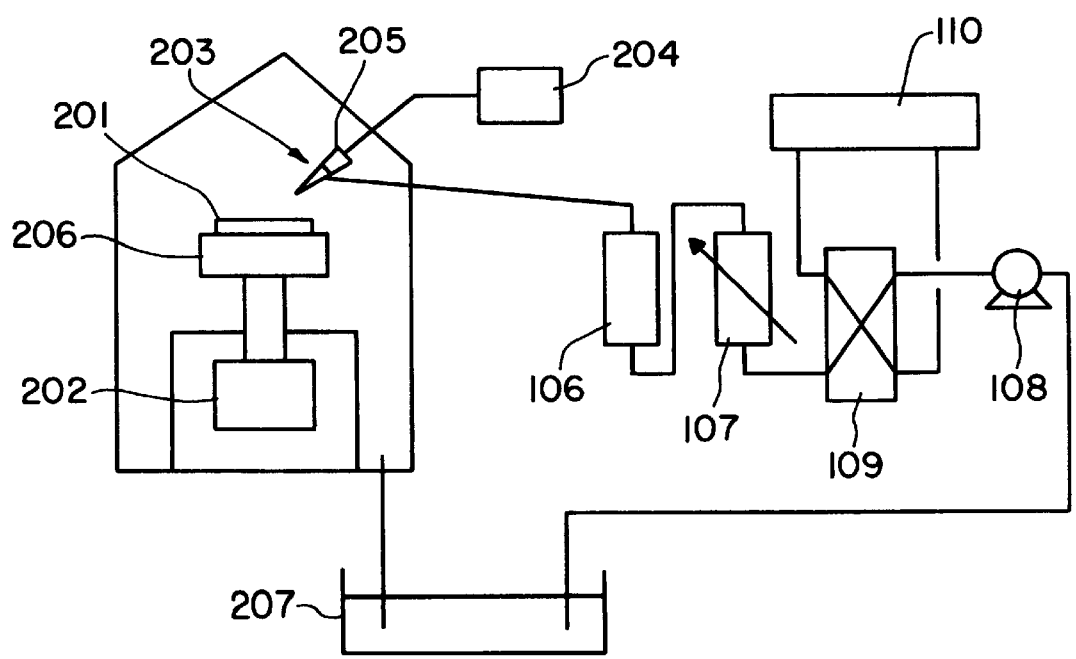
FIG. 2 is a conceptual view showing an example of the cleaning device for implementing the cleaning method according to the present invention.

Next description is made for another embodiment of the cleaning method according to the present invention with reference to FIG. 2.

In FIG. 2, designated at the reference numeral 201 is a substrate, at 202 a rotating device, at 203 a cleaning liquid supply nozzle, at 204 a cleaning liquid supply unit, and at 205 a ultrasonic vibrator. The reference numeral 206 indicates a rotary table on which a substrate is placed. With this configuration, by injecting a cleaning liquid having been subjected to irradiation of ultrasonic wave, and because of the synergistic effect with a centrifugal force, foreign materials deposited on the substrate can efficiently be removed. Herein an angle between the nozzle and a substrate should preferably be around 45 degrees.

An injection port of the nozzle have a round form, and may be moved reciprocally in the radial direction of a substrate, or a line-formed nozzle having an injection port straight in the radial direction of the substrate and narrow in the peripheral direction may be used. A size of an injection port of the nozzle should be larger than wavelength of ultrasonic wave in the cleaning liquid so that ultrasonic can efficiently pass therethrough. The method of removing foreign materials deposited on a substrate according to the present invention is executed by etching the substrate, so that the method shown in FIG. 2 is especially preferable to prevent foreign materials once removed from being deposited again on the substrate. By providing a plurality of injection nozzles, removal of foreign materials on a substrate can be carried out at a higher speed.

The present invention is advantageously used for removing foreign materials deposited and remaining on a substrate even after photoresist after ion injection and/or reactive ion etching processing used in a semiconductor production process or in the flat display panel production process, but application of the present invention is not limited to removal of photoresist, but also to removal of various types of high polymer organic coating film such as paint or adhesive, films of machine oil (including those converted to high polymers after burning) as well as to removal of surface surfactant or dye or the like.

Embodiments

Next detailed description is made for the present invention with reference to the embodiments, but it should be noted that the present invention is not limited to the embodiments described below.

Embodiment 1

Figure 3:
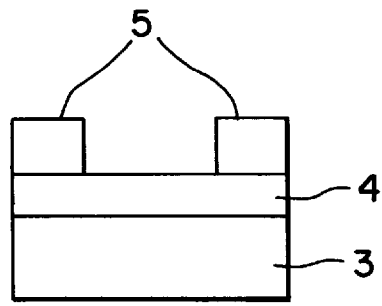
FIG. 3 is a cross-sectional view structure of an insulating layer on a silicon wafer for semiconductor production in Embodiment 1 of the present invention at a point of time when the processing up to a process of foreign a mask is finished.

FIG. 3 shows a resist mask section formed by forming a CVD oxide film 4 as an insulating film on a silicon wafer 3 for semiconductor production, coating a positive type of photoresist layer 5 for i line containing novolac-based resin as a mask, and executing exposure and development. Thickness of the CVD oxide layer 4 is 600 nm, and that of the photoresist layer 3 is 1 Ωm.

Figure 4:
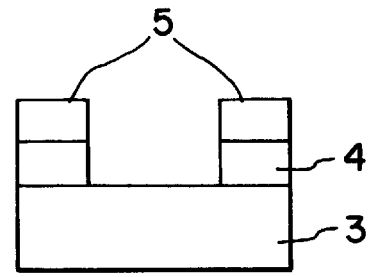
FIG. 4 is a cross-sectional view showing structure of a region not covered with a photo-mask (non-mask region) of the insulating layer in Embodiment 1 at a point of time when it is removed by means of dry etching.

FIG. 4 shows structure after a region (non-mask region) of the CVD oxide layer 4 shown in FIG. 3 and not covered by the photoresist mask layer 5 is removed by dry etching (reactive dry etching) using a fluorocarbon (CF)-based gas.

Figure 5:
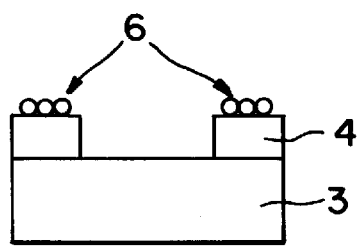
FIG. 5 is a cross-sectional view showing the structure after resist used as a mask is removed by means of ashing in Embodiment 1.

FIG. 5 shows structure after the photoresist mask layer 5 shown in FIG. 4 is ashed and removed by plasma (ashing) processing. A foreign material 6 not having been removed by the ashing processing can be seen on the CVD oxide film 4.

Figure 6:
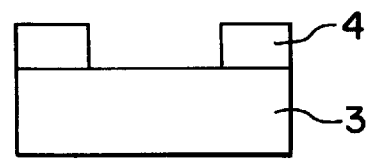
FIG. 6 is a cross-sectional view showing the structure of the substrate shown in FIG. 5 after cleaning with the cleaning liquid according to Embodiment 1 of the present invention and the cleaning device shown in FIG. 1.

Table 1 shows a result of cleaning the substrate shown in FIG. 5 with the cleaning liquid according to the present invention with the cleaning device shown in FIG. 1. FIG. 6 shows structure of the substrate shown in FIG. 5 after the substrate is cleaned with the cleaning liquid according to the present invention. A temperature of the cleaning liquid is 25° C., and a frequency of the used ultrasonic wave is 1 MHz. It should be noted that the foreign material 6 on the substrate was checked with a scanning type of electronic microscope.

The processing time is a time until any foreign material on the substrate is not observed with a scanning type of electronic microscope. Also it should be noted that, in composition of the cleaning liquid shown in Table 1, KF indicates potassium fluoride, $H_2O_2$ indicates hydrogen peroxide, $H_2O$ indicates pure water, and $NH_4F$ indicates ammonium fluoride.

TABLE 1

| Cleaning liquid | Processing time [min] |
|---|---|
| $KF/H_2O_2/H_2O$ = 0.04/5/94.96 (wt %) | 60 |
| $KF/H_2O_2/H_2O$ = 0.05/5/94.95 (wt %) | 15 |
| $KF/H_2O_2/H_2O$ = 1/5/94 (wt %) | 10 |
| $KF/H_2O_2/H_2O$ = 2/8/85 (wt %) | 3 |
| $KF/H_2O_2/H_2O$ = 51/5/44 (wt %) | 3 |
| $NaF/H_2O_2/H_2O$ = 0.04/5/94.96 (wt %) | 60 |
| $NaF/H_2O_2/H_2O$ = 0.05/5/94.96 (wt %) | 15 |
| $NaF/H_2O_2/H_2O$ = 1/5/94 (wt %) | 10 |
| $NaF/H_2O_2/H_2O$ = 3/5/92 (wt %) | 3 |
| $NaF/H_2O_2/H_2O$ = 4.8/5/90.2 (wt %) | 3 |
| $NH_4F/H_2O_2/H_2O$ = 0.04/5/94.96 (wt %) | 60 |
| $NH_4F/H_2O_2/H_2O$ = 0.05/5/94.95 (wt %) | 15 |
| $NH_4F/H_2O_2/H_2O$ = 1/5/94 (wt %) | 10 |
| $NH_4F/H_2O_2/H_2O$ = 2/5/93 (wt %) | 3 |
| $NH_4F/H_2O_2/H_2O$ = 49/5/46 (wt %) | 3 |
| $TMAF/H_2O_2/H_2O$ = 0.04/5/94.96 (wt %) | 60 |
| $TMAF/H_2O_2/H_2O$ = 0.05/5/94.95 (wt %) | 15 |
| $TMAF/H_2O_2/H_2O$ = 1/5/94 (wt %) | 10 |
| $TMAF/H_2O_2/H_2O$ = 2/5/93 (wt %) | 3 |
| $TMAF/H_2O_2/H_2O$ = 51/4/44 (wt %) | 3 |

As clearly shown in FIG. 6 and Table 1, it was confirmed that the foreign material 6 on a substrate could completely be removed by using the cleaning liquid according to the present invention.

As an example for comparison, the conventional type of cleaning for the sample shown in FIG. 5 was carried out by using mixture of sulfuric acid/ hydrogen peroxide (4:1) under the temperature of 130° C. or 10 minutes, but the foreign material 6 was not removed and remained there.

Embodiment 2

Figure 7:
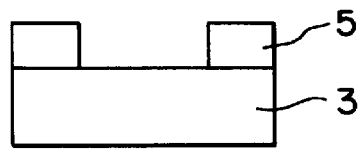
FIG. 7 is a cross-sectional view showing structure of the silicon wafer for semiconductor production in Embodiment 2 of the present invention at a point of time when the processing up to a process for forming a mask is finished.

FIG. 7 shows a resist mask section formed by coating a positive type of photoresist layer 5 containing novolac-based resin as a main ingredient as a mask on the silicon wafer 3 for semiconductor production and executing exposure and development. Thickness of the photoresist layer is 1 µm.

Figure 8:
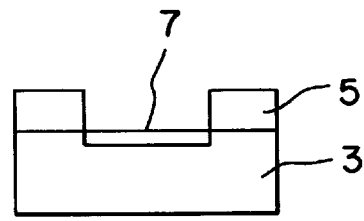
FIG. 8 is a cross-sectional view showing structure of a region of a silicon wafer for semiconductor production not covered with a photo-mask (non-mask region) in Embodiment 2 of the present invention at a point of time of ion injection.

FIG. 8 is a structure at a point of time when ion injection is executed to the region not covered with the photoresist mask layer 5 shown in FIG. 7 (non-mask layer). Phosphor is used as a dope element for ion injection, and density of phosphor on the silicon wafer after ion injection is $10^{15}/cm^2$.

Figure 9:
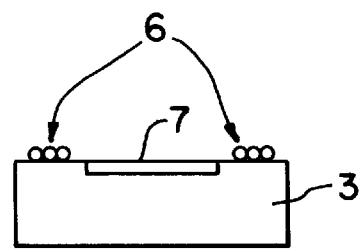
FIG. 9 is a cross-sectional view showing structure of the silicon wafer after resist as a mask is removed by ashing after ion injection in Embodiment 2.

FIG. 9 shows the structure after the photoresist mask layer 5 shown in FIG. 8 is ashed and removed by the plasma (ashing) processing. The foreign material 6 not having been removed by the ashing processing can be confirmed on the silicon layer 3 which had been covered by the photoresist mask layer 5.

Figure 10:
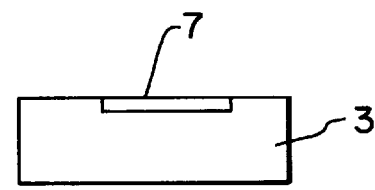
FIG. 10 is a cross-sectional view showing structure of the substrate shown in FIG. 9 after the substrate is cleaned by using the cleaning liquid according to Embodiment 2 of the present invention and the cleaning device shown in FIG. 1.

A result of cleaning of the substrate shown in FIG. 9 with the cleaning liquid according to the present invention with the cleaning device shown in FIG. 1 is shown in Table 2 and Table 3. FIG. 10 shows the structure of the substrate shown in FIG. 9 after the substrate shown in FIG. 9 is cleaned with the cleaning liquid according to the present invention by using the cleaning device shown in FIG. 1. A temperature of the cleaning liquid is 25° C., and a frequency of the ultrasonic wave used in this test is 1 MHz. It should be noted that the foreign material 6 on the substrate was confirmed with a scanning type of electronic microscope and surface roughness of the substrate was checked with an interatomic force microscope.

The processing time is a time required until no foreign material 6 is confirmed on a substrate with a scanning type of electronic microscope. In composition of the cleaning liquid shown in Table 2, KF indicates potassium fluoride, NaF indicates sodium fluoride, TMAF indicates tetra-methyl ammonium fluoride, $H_2O_2$ indicates hydrogen peroxide, $NE_4F$ indicates ammonium fluoride, $O_3$ indicates ozone water, and $H_2O$ indicates water. It should be noted that the initial surface roughness (RA) of the silicon wafer 2 for semiconductor production shown in FIG. 7 is 0.12 nm.

TABLE 2

| Cleaning liquid<br>Surface roughness (RA) [nm] | Processing time [min] |
|---|---|
| $KF/H_2O_2/H_2O$ = 2/5/93 (wt %)<br>0.12 | 3 |
| $KF/H_2O_2/H_2O$ = 20/5/75 (wt %)<br>0.13 | 3 |
| $KF/H_2O_2/H_2O$ = 21/5/74 (wt %)<br>0.18 | 3 |
| $KF/H_2O_2/H_2O$ = 30/5/65 (wt %)<br>0.18 | 3 |
| $KF/H_2O_2/H_2O$ = 31/5/64 (wt %)<br>0.21 | 3 |
| $KF/H_2O_2/H_2O$ = 51/5/44 (wt %)<br>0.22 | 3 |
| $KF/H_2O_2/H_2O$ = 52/5/43 (wt %)<br>0.30 | 3 |
| $KF/H_2O_2/H_2O$ = 3/5/92 (wt %)<br>0.13 | 3 |
| $NaF/H_2O_2/H_2O$ = 4.8/5/90.2 (wt %)<br>0.13 | 3 |
| $NaF/H_2O_2/H_2O$ = 4.9/5/90.1 (wt %)<br>0.30 | 3 |
| $NH_4F/H_2O_2/H_2O$ = 2/5/93 (wt %)<br>0.12 | 3 |
| $NH_4F/H_2O_2/H_2O$ = 20/5/75 (wt %)<br>0.12 | 3 |
| $NH_4F/H_2O_2/H_2O$ = 21/5/74 (wt %)<br>0.19 | 3 |
| $NH_4F/H_2O_2/H_2O$ = 30/5/65 (wt %)<br>0.19 | 3 |
| $NH_4F/H_2O_2/H_2O$ = 31/5/64 (wt %)<br>0.22 | 3 |
| $NH_4F/H_2O_2/H_2O$ = 49/5/46 (wt %)<br>0.22 | 3 |
| $NH_4F/H_2O_2/H_2O$ = 50/5/45 (wt %)<br>0.31 | 3 |

TABLE 3

| Cleaning liquid<br>Surface roughness (RA) [nm] | Processing time [min] |
|---|---|
| $TMAF/H_2O_2/H_2O$ = 2/5/93 (wt %)<br>0.12 | 3 |
| $TMAF/H_2O_2/H_2O$ = 26/5/75 (wt %)<br>0.12 | 3 |
| $TMAF/H_2O_2/H_2O$ = 21/5/74 (wt %)<br>0.18 | 3 |
| $TMAF/H_2O_2/H_2O$ = 30/5/65 (wt %)<br>0.19 | 3 |
| $TMAF/H_2O_2/H_2O$ = 40/5/55 (wt %)<br>0.23 | 3 |
| $KF_4/H_2O$ = 2/98 (wt %)<br>6.00 | 3 |
| $KF/H_2O_2/H_2O$ = 2/0.01/97.99 (wt %)<br>0.23 | 3 |
| $KF/H_2O_2/H_2O$ = 2/0.1/97.9 (wt %)<br>0.23 | 3 |
| $KF/H_2O_2/H_2O$ = 2/30/78 (wt %)<br>0.23 | 3 |
| $KF/H_2O_2/H_2O$ = 2/30/68 (wt %)<br>0.23 | 3 |
| $KF/O_3/H_2O$ = 2 (wt %)/0.01 ppm<br>0.23 | 3 |
| $KF/O_3/H_2O$ = 2 (wt %)/5 ppm | 3 |

TABLE 3-continued

| Cleaning liquid<br>Surface roughness (RA) [nm] | Processing time [min] |
| --- | --- |
| 0.12 | |
| $KF/O_3/H_2O$ = 2 (wt %)/100 ppm | 3 |
| 0.12 | |

As clearly shown in FIG. 10, Table 2, and Table 3, it was confirmed that the foreign material 6 on the substrate was completely removed by using the cleaning liquid according to the present invention.

As an example for control, the sample shown in FIG. 9 was cleaned with a mixture of sulfuric acid and hydrogen peroxide (4:1) under a temperature of 130° C. for 10 minutes like in the conventional technology, but the foreign material 6 on the substrate was not removed and remained on the substrate after cleaning.

Effect of the Invention

With the present invention, namely by using a cleaning liquid prepared by mixing a basic and water-soluble fluoride and an oxidizing agent in pure water, it is possible to remove foreign materials deposited on a substrate without generating surface leakage. Also the cleaning method according to the present invention was carried out under the room temperature, and vapor of chemicals is little generated during cleaning, so that size reduction of a cleaning device is possible.

The present invention can advantageously be applied to removal of foreign materials on a substrate after photoresist is removed by plasma processing, and as compared to the conventional technology, a clean surface can be realized with a high cleaning effect. Further the processing is executed under a temperature close to the room temperature, so that the adaptability for handling and safety are excellent and the waste processing can easily be executed.

The room-temperature wet cleaning technology not using high density chemicals which are to be used under a high temperature at all unlike in the conventional type of RCA cleaning has been developed. (Refer to "Ultra-Clean ULSI Technology", p. 226 to p. 233, December, 1995, Baihukan). By combining this technology with the resist separating technology according to the present invention, it is possible to completely eliminate high density chemicals such as sulfuric acid, Hydrochloric acid, nitric acid, and ammonia from semiconductor plants and liquid crystal plants.

What is claimed is:

1. A cleaning liquid, capable of etching a silicon oxide film, silicon or aluminum substrate, for removing foreign materials from said substrate, said cleaning liquid prepared by mixing a basic and water-soluble fluoride and an oxidizing agent in pure water wherein said fluoride is capable of generating $HF_2^-$ ions and is at least one salt selected from the group consisting of an alkali-metallic fluoride, ammonium fluoride, and tetra-methyl ammonium fluoride salt.

2. A cleaning method by removing foreign materials deposited on a substrate, said cleaning method comprising:
   preparing a cleaning liquid according to claim 1 by mixing said basic and water-soluble fluoride and an oxidizing agent in pure water; and
   applying said cleaning liquid to the substrate.

3. A cleaning method according to claim 2; wherein said alkali metal fluoride salt is potassium fluoride or sodium fluoride.

4. A cleaning method according to claim 2; wherein the concentration of said potassium fluoride is in a range from 0.05 to 51 wt %.

5. A cleaning method according to claim 2; wherein the concentration of said potassium fluoride is in a range from 1 to 30 wt %.

6. A cleaning method according to claim 2; wherein the concentration of said potassium fluoride is in a range from 2 to 20 wt %.

7. A cleaning method according to claim 2; wherein the concentration of said sodium fluoride is in a range from 0.05 to 4.8 wt %.

8. A cleaning method according to claim 2; wherein the concentration of said sodium fluoride is in a range from 1 to 4.8 wt %.

9. A cleaning method according to claim 2; wherein the concentration of said sodium fluoride is in a range from 3 to 4.8 wt %.

10. A cleaning method according to claim 2; wherein the concentration of said ammonium fluoride is in a range from 0.05 to 49 wt %.

11. A cleaning method according to claim 2; wherein the concentration of said ammonium fluoride is in a range from 1 to 30 wt %.

12. A cleaning method according to claim 2; wherein the concentration of said ammonium fluoride is in a range from 2 to 20 wt %.

13. A cleaning method according to claim 2; wherein the concentration of said tetra-methyl ammonium fluoride is in a range from 0.05 to 40 wt %.

14. A cleaning method according to claim 2; wherein the concentration of said tetra-methyl ammonium fluoride is in a range from 1 to 30 wt %.

15. A cleaning method according to claim 2; wherein the concentration of said tetra-methyl ammonium fluoride is in a range from 2 to 20 wt %.

16. A cleaning method according to claim 2 wherein said oxidizing agent is hydrogen peroxide water or ozone water.

17. A cleaning method according to claim 16; wherein the concentration of said hydrogen peroxide water is in a range from 0.01 to 30 wt %.

18. A cleaning method according to claim 16; wherein the concentration of said hydrogen peroxide water is in a range from 0.1 to 30 wt %.

19. A cleaning method according to claim 16; wherein the concentration of said ozone water is in a range from 0.01 to 100 ppm.

20. A cleaning method according to claim 16; wherein the concentration of said ozone water is in a range from 5 to 100 ppm.

21. A cleaning method according to claim 2 wherein said cleaning liquid is used for removing foreign materials deposited on said substrate after one of photoresist ion injection and reactive ion etching processing used in one of the semiconductor production process and flat display panel production process is removed by plasma processing.

22. A cleaning method according to claim 2 wherein said cleaning liquid is used for removing foreign materials deposited on said substrate after photoresist is removed by plasma processing and then rinsing with pure water is executed.

* * * * *